US011209808B2

(12) United States Patent
Mappus et al.

(10) Patent No.: US 11,209,808 B2
(45) Date of Patent: Dec. 28, 2021

(54) SYSTEMS AND METHOD FOR MANAGEMENT AND ALLOCATION OF NETWORK ASSETS

(71) Applicant: AT&T Intellectual Property I, L.P., Atlanta, GA (US)

(72) Inventors: Rudolph Mappus, Plano, TX (US); Mark Morris, Midlothian, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 129 days.

(21) Appl. No.: 16/418,183

(22) Filed: May 21, 2019

(65) Prior Publication Data

US 2020/0371510 A1 Nov. 26, 2020

(51) Int. Cl.
*G05B 23/02* (2006.01)
*G06F 17/16* (2006.01)
*G06F 17/18* (2006.01)

(52) U.S. Cl.
CPC ....... *G05B 23/024* (2013.01); *G05B 23/0254* (2013.01); *G05B 23/0283* (2013.01); *G06F 17/16* (2013.01); *G06F 17/18* (2013.01)

(58) Field of Classification Search
None
See application file for complete search history.

(56) References Cited

U.S. PATENT DOCUMENTS

| 5,311,562 | A | * | 5/1994 | Palusamy | .......... G05B 23/0283 |
| | | | | | 376/215 |
| 5,790,565 | A | | 8/1998 | Sakaguchi | |
| 6,820,215 | B2 | | 11/2004 | Harper et al. | |
| 7,006,947 | B2 | | 2/2006 | Tryon, III et al. | |
| 7,206,646 | B2 | * | 4/2007 | Nixon | .................. C10G 11/187 |
| | | | | | 700/79 |

(Continued)

FOREIGN PATENT DOCUMENTS

| WO | 2008036921 | 3/2008 |
| WO | 2016161263 | 10/2016 |

OTHER PUBLICATIONS

Espacenet, machine translation, Kang Deok Hun et al., Method and Apparatus for Prediction Maintenance, Mar. 9, 2017 (Year: 2017).*

(Continued)

*Primary Examiner* — Eman A Alkafawi
*Assistant Examiner* — Denise R Karavias
(74) *Attorney, Agent, or Firm* — Guntin & Gust, PLC; Mark Wilinski

(57) ABSTRACT

A method for generating a multi-layer predictive model includes collecting historical observable data from one or more pieces of equipment of a same type, wherein the historical observable data is collected at different hierarchical levels of the one or more pieces of equipment; collecting operational state indications of the pieces of equipment corresponding to the collected historical observable data; generating, from the collected historical observable data, a set of operational state models, wherein each operational state model corresponds to one of the different hierarchical levels; and generating, from outputs of the set of operational state models, a top-level operational model for the piece of equipment. The top-level operational model is operable to determine maintenance and replacement timing for the piece of equipment.

20 Claims, 5 Drawing Sheets

(56) References Cited

U.S. PATENT DOCUMENTS

| | | | |
|---|---|---|---|
| 7,243,270 | B2 | 7/2007 | Taniguchi et al. |
| 7,457,725 | B1 | 11/2008 | Civilini |
| 7,469,189 | B2 | 12/2008 | Yasuo |
| 7,496,796 | B2 | 2/2009 | Kubo et al. |
| 7,539,907 | B1 | 5/2009 | Johnsen et al. |
| 7,596,727 | B2 | 9/2009 | Kuo |
| 7,627,452 | B2 | 12/2009 | Albrecht et al. |
| 7,912,669 | B2 | 3/2011 | Basu |
| 8,140,914 | B2 | 3/2012 | Murphy et al. |
| 8,266,066 | B1 * | 9/2012 | Wezter .................. G06Q 10/06 705/78 |
| 8,489,360 | B2 * | 7/2013 | Lundeberg ......... G05B 23/0245 702/179 |
| 8,611,228 | B2 | 12/2013 | Matsunaga et al. |
| 8,949,671 | B2 | 2/2015 | Mukherjee |
| 9,291,358 | B2 * | 3/2016 | Federspiel ......... H05K 7/20836 |
| 9,292,473 | B2 | 3/2016 | Ba |
| 9,348,710 | B2 | 5/2016 | Al-wahabi |
| 9,400,731 | B1 | 7/2016 | Preece |
| 9,424,694 | B2 | 8/2016 | Senalp et al. |
| 9,500,705 | B2 | 11/2016 | Balasubramanian et al. |
| 9,542,296 | B1 | 1/2017 | Engers et al. |
| 10,048,996 | B1 | 8/2018 | Bell et al. |
| 2002/0091972 | A1 * | 7/2002 | Harris .................. G06F 11/008 714/47.2 |
| 2015/0039244 | A1 | 2/2015 | Bernstein |
| 2015/0074467 | A1 | 3/2015 | Jacoby |
| 2016/0291552 | A1 * | 10/2016 | Pal ..................... G05B 23/0283 |
| 2018/0003745 | A1 | 1/2018 | Oh et al. |
| 2018/0013376 | A1 * | 1/2018 | Sekiguchi ............... H02P 29/50 |
| 2018/0031256 | A1 * | 2/2018 | Gillette .................. F24F 11/38 |

OTHER PUBLICATIONS

Agarwal et al., "Optimized Circuit Failure Prediction for Aging: Practicality and Promise", Test Conference, 2008, ITC 2008, IEEE International, IEEE 2008, 10 pages.

Amari, "Steady-State Availability and MTBF of Systems Subjected to Suspended Animation", International Journal of Performance Engineering, vol. 3, No. 2, Apr. 2007, 3 pages.

Jin et al., "A Practical MTBF Estimate for PCT Design Considering Component and Non-component Failures", Reliability and Maintainability Symposium, 2006, RAMS'06, Annual, IEEE, 2006, 7 pages.

Jones et al., "A Comparison of Electronic Reliability Prediction Methodologies", International Electronics Reliability Institute, Department of Electronic and Electrical Engineering, (1999), 16 pages.

Neil et al., "Modelling dependable systems using hybrid Bayesian networks", Reliability Engineering and System Safety 93.7 (2008), 20 pages.

* cited by examiner

SYSTEMS AND METHOD FOR MANAGEMENT AND ALLOCATION OF NETWORK ASSETS

BACKGROUND

Unless otherwise indicated herein, the materials described in this section are not prior art to the claims in this application and are not admitted to be prior art by inclusion in this section.

Accurate predictions of when and where equipment will fail or require maintenance can enable a company to plan inventory purchases and stage of spare equipment to minimize costs. The Telcordia TR-332/SR-332 Electronic Reliability Prediction Standard represents a standard practice for estimating mean time between failures (MTBF) for equipment in the telecommunications industry. The Telcordia standard uses component level failure rates to estimate circuit and equipment level failure rates. The standard maintains a list of failure rates for components and, the specification aggregates the component failure rates to estimate MTBF for a circuit or piece of equipment.

Other approaches to estimating MTBF that build on the Telcordia standard are state-based and consider latent operational states of devices or direct modeling of operational states. These approaches estimate the probability of transitioning between operational states; the estimated probabilities can then be used to estimate the time to transitioning to a failure state. Latent state models have been successful due in part to their ability to model transitions and activity without having to have a generative or a priori model of activity.

However, in cases of multiple causes of failures and multiple failure states, transition probabilities can become convoluted affecting model interpretability and accuracy. The ability to improve MTBF predictions enables intelligent asset allocation strategies.

SUMMARY

Systems and methods for cost based optimization of network asset allocation are provided.

According to various aspects there is provided a method for generating a multi-layer predictive model. In some aspects, the method may include: collecting historical observable data from one or more pieces of equipment of a same type, wherein the historical observable data is collected at different hierarchical levels of the one or more pieces of equipment. The different hierarchical levels may be a component level, a circuit level, and a logical path level.

The method may further include collecting operational state indications of the pieces of equipment corresponding to the collected historical observable data; generating, from the collected historical observable data, a set of operational state models, wherein each operational state model corresponds to one of the different hierarchical levels; and generating, from outputs of the set of operational state models, a top-level operational model for the piece of equipment. The top-level operational model may be operable to determine maintenance and replacement timing for the piece of equipment. The operational state indications may include an operational state indication, a degraded state indication, and a failed state indication.

The method may further include collecting the historical observable data asynchronously between the different hierarchical levels. In response to collecting the historical observable data asynchronously, the method may include generating a first covariance matrix between outputs of a first hierarchical level operational state model and outputs of a second hierarchical level operational state model; generating a second covariance matrix between the outputs of the second hierarchical level operational state model and outputs of a third hierarchical level operational state model; and generating the top-level operational model using the first covariance matrix and the second covariance matrix as input.

The method may further include temporally aligning the asynchronously collected historical observable data between the different hierarchical levels. Each of the first hierarchical level operational state model, the second hierarchical level operational state model, and the third hierarchical level operational state model, may output a single state probability estimate for a sequence of input observable data. The operational state indications may be correlated to the asynchronously collected historical observable data for one of the different hierarchical levels.

The method may further include generating a top-level model output based on a product of a highest probability estimation state from each of the first covariance matrix and the second covariance matrix. The top-level model output may be a probability estimate of a next operational state or a mean time between failure (MTBF) for the piece of equipment.

The method may further include collecting the historical observable data synchronously between the different hierarchical levels. In response to collecting the historical observable data synchronously, the method may further include: generating the top-level operational model using a first hierarchical level operational state model, a second hierarchical level operational state model, and a third hierarchical level operational state model. The method may further include generating a top-level model output based on a product of probability estimation states from outputs of each of the first hierarchical level operational state model, the second hierarchical level operational state model, and the third hierarchical level operational state model.

Each operational state model of the set of operational state models may be a machine learning model trained with the historical observable data collected from corresponding hierarchical levels. The top-level operational model may be a machine learning model trained with outputs of the set of operational state models and corresponding operational state indications.

According to various aspects there is provided a computer-implemented method for estimating a next operational state of a piece of equipment. In some aspects, the computer-implemented method may include: collecting observable data from the piece of equipment, wherein the observable data is collected at different hierarchical levels of the piece of equipment. The different hierarchical levels may be a component level, a circuit level, and a logical path level.

The computer-implemented method may further include determining that the observable data is collected asynchronously between the different hierarchical levels. In response to determining that the observable data is collected asynchronously the computer-implemented method may further include: generating a first covariance matrix between outputs of a first hierarchical level operational state model and outputs of a second hierarchical level operational state model; generating a second covariance matrix between the outputs of the second hierarchical level operational state model and outputs of a third hierarchical level operational state model; and generating the output of the top-level operational model based on a product of a highest probability estimation state from each of the first covariance matrix and the second covariance matrix, wherein the output of the top-level operational model is a probability estimate of a next operational state or a mean time between failure (MTBF) for the piece of equipment.

The computer-implemented method may further include determining that the observable data is collected synchronously between the different hierarchical levels. In response to determining that the observable data is collected synchronously, the computer-implemented method may further include generating the output from the top-level operational model based on a product of probability estimation states from outputs of each of a first hierarchical level operational state model, a second hierarchical level operational state model, and a third hierarchical level operational state model.

Each operational state model of the set of operational state models may be a machine learning model trained with the historical observable data collected from corresponding hierarchical levels. The top-level operational model may be a machine learning model trained with outputs of the set of operational state models and corresponding operational state indications.

According to various aspects there is provided an apparatus. In some aspects, the apparatus may include: a memory configured to store program instructions and data and a processor configured to communicate with the memory. The processor may be further configured to execute instructions read from the memory. The instructions may be operable to cause the processor to perform operations including: collecting observable data from a piece of equipment, wherein the observable data is collected at different hierarchical levels of the piece of equipment. The different hierarchical levels may be a component level, a circuit level, and a logical path level.

The operations may further include inputting the collected observable data to a predictive model at a set of operational state models corresponding to the different hierarchical levels; generating an output from each operational state model of the set of operational state models, the output being a state probability estimate for each of the different hierarchical levels; and generating, from a top-level operational model, an output based on the outputs of the set of operational state models, wherein the output from the top-level operational model is a probability estimate of a next operational state or a mean time between failure (MTBF) for the piece of equipment. The next operational state may include an operational state indication, a degraded state indication, and a failed state indication.

The instructions may be further operable to cause the processor to perform operations including determining that the observable data is collected asynchronously between the different hierarchical levels. In response to determining that the observable data is collected asynchronously, the instructions may be further operable to cause the processor to perform operations including: generating a first covariance matrix between outputs of a first hierarchical level operational state model and outputs of a second hierarchical level operational state model; generating a second covariance matrix between the outputs of the second hierarchical level operational state model and outputs of a third hierarchical level operational state model; and generating the output of the top-level operational model based on a product of a highest probability estimation state from each of the first covariance matrix and the second covariance matrix, wherein the output of the top-level operational model is a probability estimate of a next operational state or a mean time between failure (MTBF) for the piece of equipment.

The instructions may be further operable to cause the processor to perform operations including determining that the observable data is collected synchronously between the different hierarchical levels. In response to determining that the observable data is collected synchronously, the instructions may be further operable to cause the processor to perform operations including generating the output from the top-level operational model based on a product of probability estimation states from outputs of each of a first hierarchical level operational state model, a second hierarchical level operational state model, and a third hierarchical level operational state model.

Each operational state model of the set of operational state models may be a machine learning model trained with the historical observable data collected from corresponding hierarchical levels. The top-level operational model may be a machine learning model trained with outputs of the set of operational state models and corresponding operational state indications.

Numerous benefits are achieved by way of the various embodiments over conventional techniques The proposed solution provides a scalable solution that enhances the state of the art in estimating MTBF for equipment. The solution also provides a hierarchical latent state model that is interpretable for its estimates. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

According to aspects of the present disclosure, a MTBF prediction system can improve next operational state and/or MTBF predictions, enable intelligent asset allocation strategies, and improve decommissioning strategies. For example, in network hardware inventory management (e.g., purchasing, allocation, etc.), both model interpretability and accuracy are important for purchasing and positioning replacement equipment to anticipate equipment failures. In addition, the ability to explain why the MTBF prediction system estimates failure states or non-failure states enables improved situational awareness for managers and operations teams for executing intelligent inventory management.

The MTBF prediction system models modes of operation in terms of the physical states of components, the circuit level usage states of operation, and the logical and usage states of components. Modeling at these levels improves the characterization of failure estimates and the estimation of failures in general. With sufficient data at each level to model transitions between states at each level, the overall MTBF prediction system can capture details about operations that previous models were not capable of detecting.

To estimate MTBF for a piece of equipment, the MTBF prediction system collects and registers observations (i.e., data from variables that can be measured) from three layers that represent different functions/operations: a component layer, a circuit layer, and a logical path layer. The MTBF prediction system may build latent state (i.e., operational states that cannot be directly measured) models from these observations. The output of those latent state models can used as input to build a top-level latent state model that estimates the next operational state and/or MTBF of the piece of equipment. The top-level latent state model may be referred to herein as a top-level latent state operational model, a top-level model, a top-level operational model, or a top-level hierarchical latent state model depending on context.

The MTBF prediction system uses historical data collected from similar pieces of active equipment to inform the models. The MTBF prediction system can use both synchronously and asynchronously collected data for the three first level model layers (i.e., component, circuit, logical path). Once trained, a top-level latent state model produces MTBF estimates for activity sequences of pieces of equipment and continues training as additional data arrive.

Figure 1:
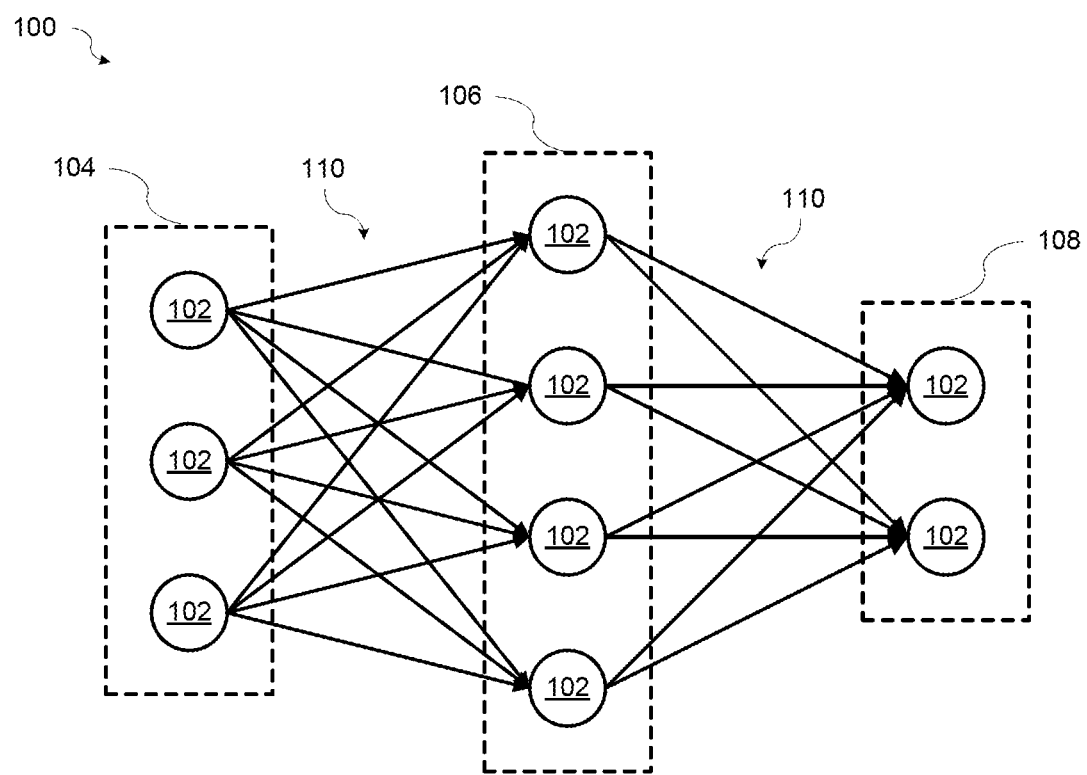
FIG. 1 illustrates a general example of visual model for a neural network according to various aspects of the present disclosure.

The MTBF prediction system may be implemented by a machine learning model. Machine learning technology has applicability for companies seeking to accurately monitor equipment state to minimize operational disruptions. FIG. 1 illustrates a visual model 100 for a general example of a neural network according to various aspect of the present disclosure. A neural network may execute a neural network model. A neural network model may also be referred to herein as a machine learning model. Referring to FIG. 1, the model 100 includes an input layer 104, a middle layer (i.e., a "hidden" layer) 106, and an output layer 108. In general, a neural network implementation can include multiple hidden layers.

Each layer includes some number of nodes 102. The nodes 102 of the input layer 104 may be connected to each node 102 of the hidden layer 106. The connections may be referred to as weights 110. Each node 102 of the hidden layer 106 may have a connection or weight 110 with each node 102 of the output layer. The input layer 104 can receive inputs and can propagate the inputs to the hidden layer 106. Weighted sums computed by the hidden layer 106 (or multiple hidden layers) are propagated to the output layer 108, which can present final outputs to a user.

One of ordinary skill in the art will appreciate that the neural network illustrated in FIG. 1 is merely exemplary and that different and/or additional neural networks, for example, but not limited to, Long Short Term Memory (LSTM) neural networks, feedforward neural networks, radial basis function neural networks, or other types of neural networks, may be used without departing from the scope of the present disclosure.

Data (i.e., observations) may be collected synchronously or asynchronously for the MTBF prediction system. Historical data for training the model layers for a piece of equipment (e.g., a network asset) may be obtained from measurements of various parameters collected over time from similar pieces equipment operating in the field. The data may include operational data used to model physical characteristics, for example, voltages, currents, operating temperature, amps, radio frequency (RF) characteristics, etc., obtained by instrumenting the pieces equipment with sensors, as well as environmental data, for example, ambient temperature, humidity, vibration, etc.

In some cases, components, for example, but not limited to, integrated circuits, may have built-in instrumentation for collecting data. Data from instrumented equipment (e.g., smart meters) may also be collected. Where only ambient environment data (e.g., "off-equipment" data), for example, cabinet or room temperature data, input current data, ambient or room RF data, etc., is available, the condition of each component may be estimated with those data using statistical distribution models on the hardware. In addition, operational states (e.g., operational, degraded, or failed) of the pieces equipment corresponding to the operational and environmental data may be collected (e.g., from an equipment status monitor).

In some implementations, data may be collected synchronously at the different model layers for a piece of equipment, meaning that the observations in each layer are all collected at the same time. The data may be collected, for example at a rate of 60 samples per second or another rate. In addition, the corresponding operational states of the equipment may be collected. In other cases, data may be collected asynchronously at the different model layers, meaning that the observation at one model layer are collected at a different time than the observations collected at the other model layers. Collection of the asynchronously collected data should occur in the same time range (i.e., over the same temporal extent) for the model layers of a piece of equipment.

According to various aspects of the present disclosure, a piece of equipment may be represented as a hierarchy of three first stage model layers (i.e., component level, circuit level, and logical path level) for modelling. Sensor arrays attached to equipment, built-in equipment instrumentation, and/or ambient instrumentation may be used to collect information about equipment performance at each of the three layers to construct a corresponding top-level hierarchical latent state model. The top-level hierarchical latent state model may be used to determine maintenance and replacement timing (e.g., by estimating a next operational state or MTBF) for the piece of equipment.

A latent state model relates a set of observable (i.e., directly measured) variables, for example, voltage or current at a circuit test point, to a set of variables that are not directly observed (i.e., latent variables), for example, an internal operational state of an integrated circuit or a piece of equipment. The latent variables are inferred from the observable variables. The nature of the hierarchical latent state model enables limiting the computations performed by the MTBF prediction system; thus, the resulting inference tool is scalable. Modes of operation in terms of the physical states of components, circuit level usage states of operation, and logical level usage states of operation may be modeled.

Modeling at these three layers represents an improvement in the characterization of failure estimates and the estimation of failures in general.

Figure 2:
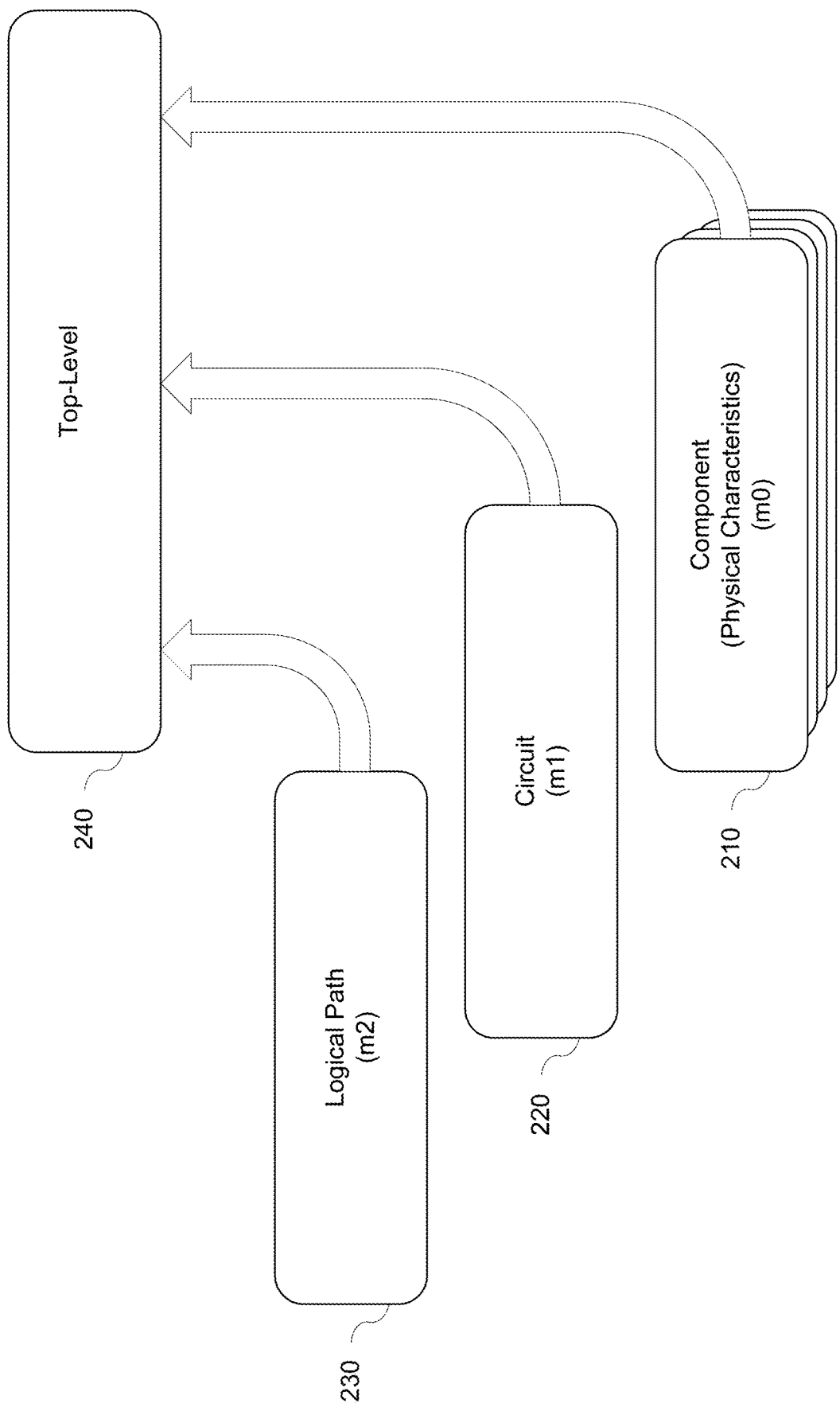
FIG. 2 is a block diagram illustrating the hierarchy of layers according to various aspects of the present disclosure.

FIG. 2 is a block diagram illustrating the hierarchy of model layers according to various aspects of the present disclosure. Referring to FIG. 2, a piece of equipment for which the operational state and/or MTBF is to be calculated may be represented as three layers: a component layer (m0) 210, a circuit layer (m1) 220, and a logical path layer (m2) 230. The component layer 210 may also be referred to herein as the physical characteristics layer.

Observations, i.e., measurements made by various sensors, may be made at each of the three model layers and, based on the observations, latent state models for each layer may be constructed. Data can be generated from the models of the component level, circuit level, and logical level in conjunction with observable features. With sufficient data at each level to model the transitions between operational states at each level, the MTBF prediction system can capture details about equipment operations that previous models were not capable of detecting while providing the ability to generate explanations of predictions.

For each layer, a latent state model that captures working operational states and failure states may be determined from the collected historical data. The latent state model for a given layer may be based on the observations (i.e., sensor measurement data) from that layer. Once the latent state models are developed, subsequent observations (i.e., new sensor measurement data) may be used to estimate a current latent state for each layer, for example, for a new piece of equipment. Given the estimated current latent state from each model, the operational state for the equipment may be estimated based on a single top-level latent state operational model for the equipment. The single top-level latent state operational model may be generated using the estimates of the current latent states of the hierarchical model layers and the observations from each of the hierarchical model layers.

At the first level of the hierarchical model (m0), the component layer 210, physical characteristics of hardware components, for example, integrated circuits, capacitors, resistors, etc., may be modeled. The modelled physical characteristics may include characteristics such as temperature, vibration, friction, etc., that can affect MTBF for hardware components. A first level (m0) model may be developed for each identified component.

At the second level of the hierarchical model (m1), the circuit process level 220, input and output characteristics, for example, input voltage and/or current signals, of the hardware may be modeled. Similar data types as collected at the m0 layer may be collected together with the additional inputs and outputs of the circuit.

At the third level of the hierarchical model (m2), the logical path level 230, operational hours of logical paths may be modeled. Logical paths as used herein refer to operational circuit paths. For example a transmitter circuit may operate in a low power mode when communicating with one receiver and may operate in a high power mode when communicating with another receiver. Different logical signal and power paths through the same transmitter circuit may be used for the low and high power modes. Similar data types as collected at the m0 and m1 layers may also be collected as well as the operational hours.

For circuits and components, different logical paths may have different effects on hardware lifetimes. Operational hours of logical paths may be modeled based on the instrumented input and output data. In cases where instrumented data on logical path operational hours is unavailable, logical paths between pairs of components may be modeled using the data collected from m0 (i.e., the component layer 210) to estimate operational hours/utilization of groups of components.

In some cases, the hierarchical levels may be represented at different functional/operational levels. For example, the component layer, rather than representing an individual component such as a resistor or capacitor, may represent a printed circuit board (PCB) assembly, the circuit layer, rather than representing a single circuit, may represent a module containing several PCBs forming a larger circuit, and the logical path layer represent various combinations of functions provided by different PCBs representing a functional path. In some cases, the PCB or module may correspond to a serviceable or replaceable part. Many variations and alternatives may be recognized for defining the various layers.

Machine learning models for each of the three hierarchical first stage model layers (component (m0), circuit (m1), and logical path (m2)) may be trained using the historical data (e.g., observations and operational states) collected from the other similar pieces of equipment. Using the historical data, the machine learning models may be trained to estimate the state of a component, circuit, or logical path. In the case of the component level model (m0), a separate machine learning model may be trained for each identified component.

In accordance with aspects of the present disclosure, to estimate next operational states and/or MTBF for a piece of equipment, the MTBF prediction system may collect and register observations from the three first stage model layers: the component layer m(0), the circuit layer m(1), and the logical path layer m(2). The MTBF prediction system then uses these observations to train a top-level latent state model to learn a state model and transitions between states for the equipment level (i.e., top-level) operational model 240. Once trained, the top-level model 240 can produce MTBF estimates for activity sequences of a piece of equipment and continues training as additional new data arrive. When used in conjunction with hardware and logical operational hours data, these features create a representation of an operational state that improves the state of the art in estimating time to failure as well as transitions between states (e.g., operational, degraded, failed).

Each of the trained machine learning models can be used to estimate a probability of a next state (e.g., operational or failure) of a corresponding component (m0), circuit (m1), or logical path (m2) for a new piece of equipment using new data (e.g., observations) generated by the new equipment as input to the models. That is, when new data is input for each component at the m0 level, the machine learning models for the m0 level may estimate the probability of a next state for each component. Similarly, when new data is input for each circuit at the m1 level, the machine learning models for the m1 level may estimate the probability of a next state for each circuit. Finally, when new data is input for each logical path at the m2 level, the machine learning models for the m2 level may estimate the probability of a next state for each logical path. The estimated output state probabilities for all the models (e.g., m0, m1, and m2) may be used as input to train the single top-level model 240 to generate the next state probability for the piece of equipment.

The MTBF prediction system builds computational models to estimate the latent (i.e., unobservable) operational states at each model layer. The models are trained with the historical data to learn the relationships between the observations (e.g., the instrumented data collected for each layer)

and the latent states. Within each of the three input first stage model layers (i.e., component, circuit, logical path), the most likely operational state S may be estimated at each time step given the observations ω where observations are collected over time $\omega = \omega_{t_0} \ldots \omega_{t_n}$ and each $\omega_{t_n}$ is a vector of observations. Observation vector elements (e.g., accelerometer and temperature data collected within a layer) are collected at the same time.

The number of latent states to be associated is a parameter supplied to each layer's models when it is trained. The MTBF prediction system may additionally compute the sample entropy (n=−log(ω$_1$/ω$_2$)) between features at each data point for a collection of time windows (e.g., 10 seconds, 10 minutes, 10 days) to augment the input data for building these models. Once trained, the models can be capable of outputting the most likely latent states given a sequence of simulated or actual observations. The models can also estimate the next most likely state given the current state (i.e., given only the current observation).

The output of each of the three first stage model layers are the sequences of most likely latent states. The desired output is the operational state with the highest probability given the history of observations ω. The likelihood of a sequence of states $S=S_0 \ldots S_t$ is:

$$\mathcal{L}(S|\omega) = \prod_t p(S_t|\omega_t) \qquad (1)$$

and the likelihood of the most likely sequence is:

$$\mathcal{L}(S|\omega) = \prod_t \underset{S}{\operatorname{argmax}} (p(S_t|\omega_t)) \qquad (2)$$

The trained first stage model layers output estimates of the most likely states given a sequence of observations. The MTBF prediction system uses the outputs of the first stage model layers as inputs to train the top-level model for state estimation. To use the estimates in the top-level model, relations may be established for the observations between the first stage model layers. The relations may be established depending on how the observation data are collected for each first stage model layer in relation to the other first stage model layers. The data may be collected synchronously, meaning that observations for each first stage model layer are all collected at the same time, or the data may be collected asynchronously, meaning that observations in one first stage model layer are collected at a different time than the other first stage model layers.

The MTBF prediction system may estimate the equipment level operational state using the outputs of the three first stage model layers. Depending on the data collection type (i.e., synchronous or asynchronous), the equipment level model uses different methods of processing the input data to produce operational state estimates.

When the data for each first stage model layer are collected synchronously (i.e., at the same time), the MTBF prediction system builds the top-level latent state model in the same manner as the first stage model layers. The top-level (i.e., equipment level) latent state model uses the outputs of the first stage model layers as input in conjunction with the operational state. The time range of the data that was used to train the first stage model layers is used to train the top-level model.

In the synchronous case, each first stage model layer outputs a state estimate. As observations arrive to each first stage models, each first stage model layer generates a state estimate for each observation. The state estimates are the input to the top-level model. The top-level model produces a single state estimate for the equipment operation, one state estimate for each observation. The top-level model is trained using historical data similar to, but not the same as, the historical data used to train the first stage models. The training data for the top-level model may additionally include an equipment state label (e.g., normal, impaired, fault). During historical data collection, these states are recorded alongside the collected observation data, for example, from an equipment status monitor.

When the data for each first stage model layer are collected asynchronously (i.e., not collected at the same time), the MTBF prediction system may use a different method to estimate operational states than is used when the data is collected synchronously since there will not be a temporal dependence between the first stage model layers.

In the asynchronous case, the model outputs a single state estimate for a sequence of input observations. As in the synchronous case, the first stage models each produce state estimates, but the first stage model outputs are used to build the pair of covariance matrices. The covariance matrices are then the input the top-level model. The top-level model is also trained using historical data that has the equipment state label. In the asynchronous collection case, equipment level states are synchronized with the logical level observation data.

Figure 3:
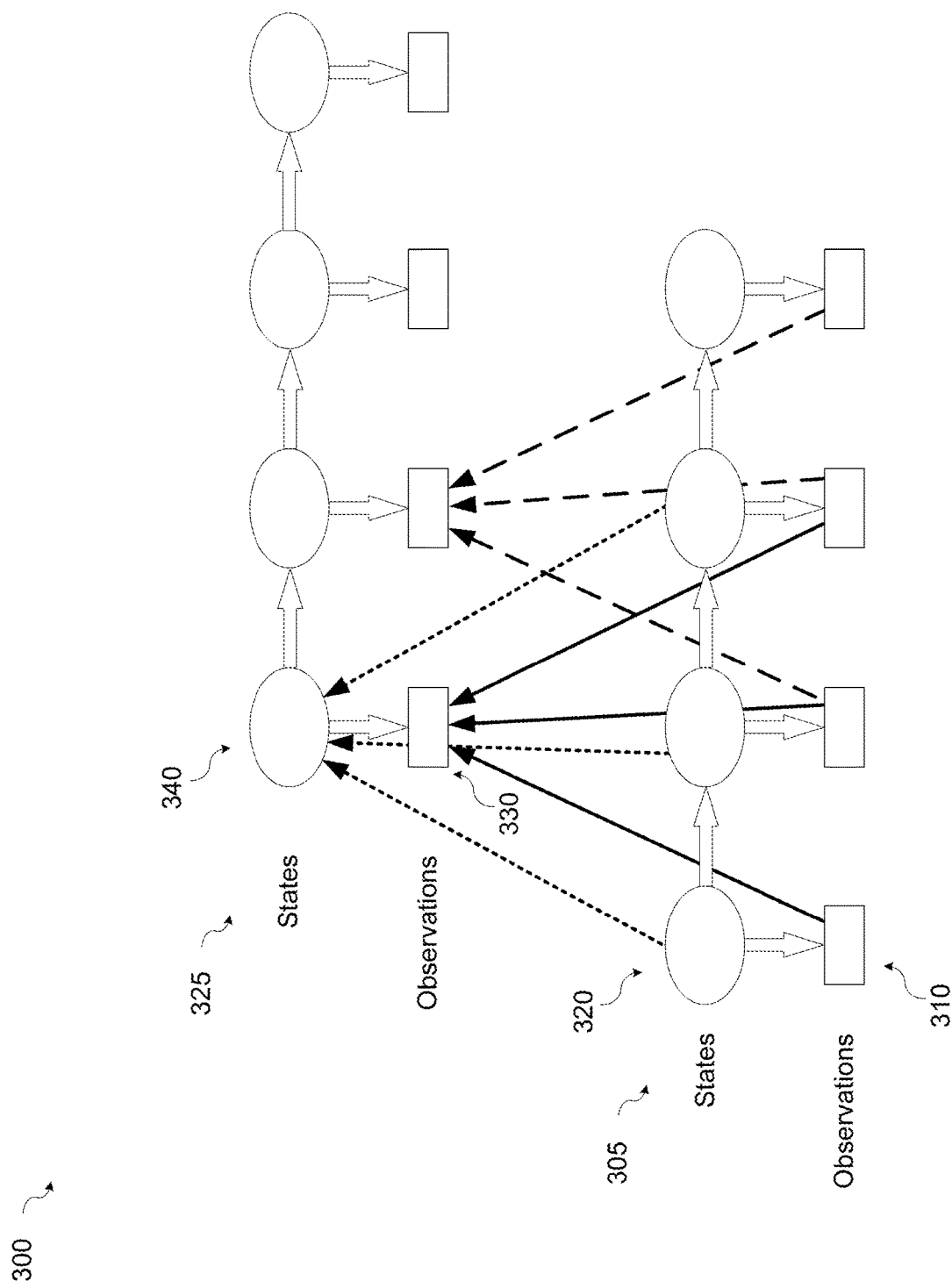
FIG. 3 is a diagram illustrating an example of aligning observations and states between models for different layers when data is collected asynchronously according to various aspects of the present disclosure.

FIG. 3 is a diagram illustrating an example of aligning observations and states between models for different layers when data is collected asynchronously according to various aspects of the present disclosure. Referring to FIG. 3, at a first (lower) level 305 of the hierarchy, measured data, i.e., observations 310, may be collected and associated with operational states 320 for the first level during a given time period. At a second (higher) level 325 of the hierarchy, measured data, i.e., observations 330, may be collected and associated with operational states 340 for the second level 325. While not synchronous, the asynchronously collected data should occur over the same temporal extent as the time over which the observations 310 were collected for the first level 305.

As illustrated in FIG. 3, several observations 310 at the first level 305 may be correlated with an observation 330 at the second level 325. Similarly, several operational states 320 at the first level 305 may be correlated with an operational state 340 at the second level 325. In some cases, an operational state at the first level may be correlated with more than one operational state at the second level.

In the asynchronous data collection case, a pair of covariance matrices may be generated using the output state sequences from the first stage model layers: a first covariance matrix between the component level (m0) and circuit level (m1) outputs (i.e., the estimates of the most likely states given a sequence of observations) and a second covariance matrix between the circuit level (m1) and logical path level (m2) outputs. For example, the covariance between two sets of latent state estimates $S_{m_0}$ and $S_{m_1}$ is $$E[(S_{m_0}-E[S_{m_0}])(S_{m_1}-E[S_{m_1}])] \qquad (3)$$

The hierarchy of layers may be used to make estimating the relationship between the first stage model layers computationally easier than finding the joint probabilities of observations. As a result of the hierarchical approach, computing all pairs of covariances may be avoided.

The outputs from each model layer of the hierarchy may be used to generate the correlation matrices to find the highest correlation states between the pairs of models (i.e., component/circuit and circuit/logical). The MTBF prediction system can compute the two covariance matrices using the outputs of the three first stage models: one between the component and circuit layers and one between the circuit and logical path layers. These matrices can become the input observations for the top-level latent state model. The top-level latent state model can be trained based on the relationships between all three layers given the pairwise state inputs from the two covariance matrices. The highest correlation states between the pairs of states given in the covariance matrices are input into the top-level latent state model, and the outputs of the top-level latent state model are the operational state estimates for the piece of equipment.

To determine transitions between observations and states between the three first stage model layers (e.g., component, circuit, logical path), the correlation between pairs of observables (e.g., (O_m0, O_m1)) is first determined. The hierarchy may be used to organize observations and states from the three models to determine transitions between states in the larger, hierarchical state/action space.

The objective in asynchronous data collection is to generate a top level model that predicts the relationships between the three first stage models without having to compute the full joint probabilities of all three first stage models. The MTBF prediction system can use the covariance matrices between pairs of first stage models (component & circuit and circuit & logical) as the input for the top-level latent state model. The hierarchy of the first stage model layers limits the combinatorics of the state/observation space in that not all combinations of state/observation co-occurrences are considered. For example, at any point in a time series of observations, to compute the probability of an observation in the top-level latent state model (i.e., p(O_mTL)) at time $t_n$, the top-level latent state model may compute the probability of an observation in model m0 (i.e., O_m0) given an observation in model m1 (i.e., O_m1) multiplied by the probability of an observation in model m1 (i.e., O_m1) given an observation in model m2 (i.e., O_m2) as, shown in equation 4, rather than the full joint probability p(O_mTL|O_m0, O_m1, O_m2).

$$p(O\_mTL)=p(O\_m0|O\_m1)*p(O\_m1|O\_m2)) \quad (4)$$

The following example is presented to further explain the operation of the MTBF prediction system for estimating a next operational state and/or MTBF for a new piece of equipment according to aspects of the present disclosure. To estimate future operational states of a new piece of equipment, new observations (i.e., new data) collected from a piece of equipment are input to each of the first stage models. Each of the first stage model layers outputs sequences of most likely latent states (i.e., the operational states with the highest probability given the observations). The outputs of the first stage model layers are used as input to the top-level model to predict future operational states, for example, operational, degraded, or failed, and or to predict MTBF.

A new piece of equipment may be identified to monitor and estimate likely time to failure. A collection of historical data from other pieces of equipment of the same type may be obtained to observe the transitions to failure states over time. The historical data from the other pieces of equipment may have been previously generated by instrumenting the other pieces of equipment as described above with temperature sensors to collect component level operating temperatures of specified components, accelerometers to capture vibration and movement data, as well as voltage and current sensors to capture voltage and current values at specified locations and operating hours. In addition, corresponding operational states (e.g., operational, degraded, failed) may be collected, for example, from equipment status monitors that monitor the states of the pieces of equipment. The data may have been collected synchronously or asynchronously. One of ordinary skill in the art will appreciate that other sensors may be used to collect data on other characteristics of the equipment without departing from the scope of the present disclosure. The historical data collected from the other pieces of equipment may include working states, for example operational or failure states, corresponding to the collected data.

At each layer of the model (e.g., component, circuit, logical path), data, for example, but not limited to, voltage, temperature, operational hours, and accelerometer data, may be collected for several months. The data may be collected, for example at a rate of 60 samples per second or another rate, for several pieces of equipment, all of which are of the target equipment type. In addition, the corresponding operational states of the equipment may be collected, for example, from an equipment status monitor.

At the component level, latent state models that associate observables (e.g., sensor measurements) to the latent operational states may be generated for each component for which data is collected (e.g., for a 10-component circuit, 10 latent state models may be generated) based on the collected data and the operational state labels. The component level models may output the sequences of most likely latent states. Similarly, the circuit level and logical path level models may output the sequences of most likely latent states based on the circuit level and logical path level observables, respectively.

Using these data, a model, for example, but not limited to, a hidden Markov model (HMM) or recurrent neural network (RNN), for each layer in the hierarchy (i.e., component, circuit, and logical layers) may be generated. Each of the three models may be trained to learn the association between the observables (e.g., temperature, power, movement, hours, etc.) and the operational states of the model (e.g., operational, degraded, and failed). The outputs of the three models form the input to the top-level latent state model that produces a single operational state prediction. In the case of asynchronously collected data, to make a single top-level operational state prediction, the data from the three layers may be aligned to determine the current state of the equipment. Correlation matrices may be generated from the output sequences of most likely latent states between the component/circuit and circuit/logical layers.

The operational latent state model learns the latent operational states from each hierarchical layer of the model (e.g., component, circuit, logical path) using the failure states from each layer as failure states in the operational state model. The operational latent state model enables determination of the probability of transition to failure state in the latent state model given the present state and observation sequence as shown by the argmax function of equation 5.

$$\arg\max\_P(\text{failure})M(S\_m0_{tn}, S\_m1_{tn}, S\_m2_{tn}, O\_0_{tn}, O\_m1_{tn}, O\_m2_{tn}) \quad (5)$$

Equation 5 indicates that the MTBF prediction system can use the top level transition probabilities to estimate the probability of the earliest opportunity of the equipment to transition to a failure state.

An objective for the MTBF prediction system for both synchronous and asynchronous data collection is to estimate the time to failure or the next operation state for a piece of equipment given the collected observations. The top-level latent state model estimates the transition probabilities between the operational (e.g., latent) states of the equipment. These state transition probabilities are used to estimate the most likely operational states the equipment will experience in the future. The MTBF prediction system does this by computing the next most likely state of the top-level latent state model given the current state estimates of the first stage models obtained using the current observations. Using this next most likely state, the MTBF prediction system can compute a subsequent next most likely state. The MTBF prediction system can compute the most likely future states in this fashion and can also estimate the earliest most likely transition to particular states in the top-level latent state model (e.g., the earliest, most likely transitions to failure states).

When new data (e.g., observations) from a new piece of equipment are input to the trained first stage model layers, the trained top-level model may use the outputs of the first stage model layers to form the single operational state estimate for the new piece of equipment for each observation. The top-level model may output the operational state estimates as a vector.

The operational state estimates output by the top-level model can enable computation of the MTBF of a piece of equipment. For example, by estimating the probabilities of transitions to failure states in the models, the expected time between failures (i.e., MTBF) may be computed.

Figure 4:
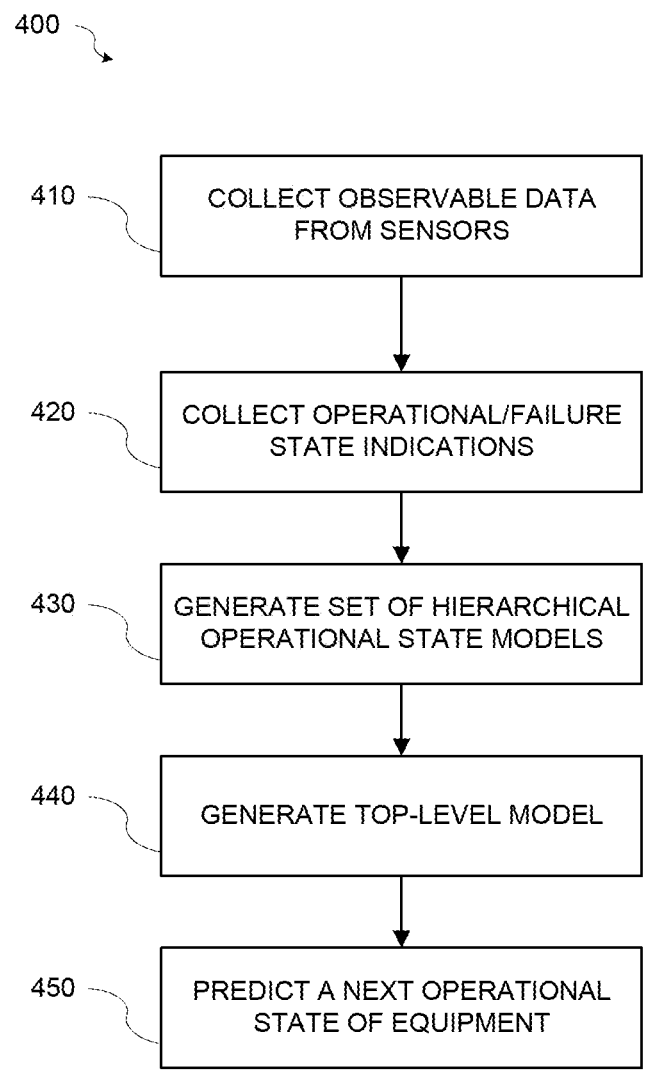
FIG. 4 is a flowchart illustrating a method for estimating a next operational state and/or MTBF for a new piece of equipment according to various aspects of the present disclosure.

FIG. 4 is a flowchart illustrating a method 400 for predicting MTBF according to various aspects of the present disclosure. Referring to FIG. 4 at block 410, observable data may be collected from sensors configured to sense operating characteristics of a piece of equipment at a plurality of hierarchical layers (e.g., component, circuit, logical path) of the equipment. For example, data for a piece of equipment may be collected over a period of time from sensor arrays attached to the piece of equipment, built-in equipment instrumentation, and/or ambient instrumentation may be used to collect information about equipment performance. The data may be collected, for example at a rate of 60 samples per second or another rate, for several pieces of equipment, all of which are of the target equipment type. Thus, the collected data will be historical data.

At block 420, operational state indications of the piece of equipment may be collected. The operational states of the equipment (e.g., operational, degraded, failed) may be collected, for example, from an equipment status monitor. The operational states may be correlated with the collected observable data collected for each of the hierarchical layers.

At block 430, the historical data and associated operational states collected at blocks 410 and 420 may be used to generate a set of hierarchical latent state models associated with each layer of the equipment (e.g., the first stage model layers). As explained above, generation of the first stage model layers may differ based on whether data collection is synchronous or asynchronous. At each model layer (e.g., component, circuit, logical path), the historical data, for example, but not limited to, voltage, temperature, operational hours, and accelerometer data, may be used to train machine learning models that can predict latent states. At the component level, models may be developed for each selected component (e.g., the components).

The component level models may output sequences of most likely latent states based on observables (i.e., input data). Similarly, the circuit level and logical path level models may output the sequences of most likely latent states based on the circuit level and logical path level observables, respectively.

At block 440, the top-level model may be generated. The top-level model may use the outputs of the first stage model layers to form the single operational state values for the overall equipment. As explained above, generation of the top-level model may differ based on whether data collection is synchronous or asynchronous.

At block 450, after the models are constructed, new data for a piece of equipment under investigation may be fed into the models at each layer of the hierarchy. The new data may be collected synchronously or asynchronously and may be processed accordingly by the model as explained above. Each of the first stage model layers may output an operational state estimate for each input observation. When the data is collected synchronously, each first stage model outputs a state estimate for each observation and the state estimates are the input to the top-level model. When the data is collected asynchronously, the first stage models each produce state estimates, but the first stage model outputs are used to build the pair of covariance matrices. The covariance matrices are the input to the top-level model. The top-level model may output a next operational state estimate for the piece of equipment based on the estimates provided by the outputs of each of the first stage model layers. Thus, execution of the model may predict a next operational state and/or an MTBF prediction for the equipment under investigation.

It should be appreciated that the specific steps illustrated in FIG. 4 provide a particular method for providing training data for a neural network model according to an embodiment. Other sequences of steps may also be performed according to alternative embodiments. For example, alternative embodiments may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

The method 400 may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

Figure 5:
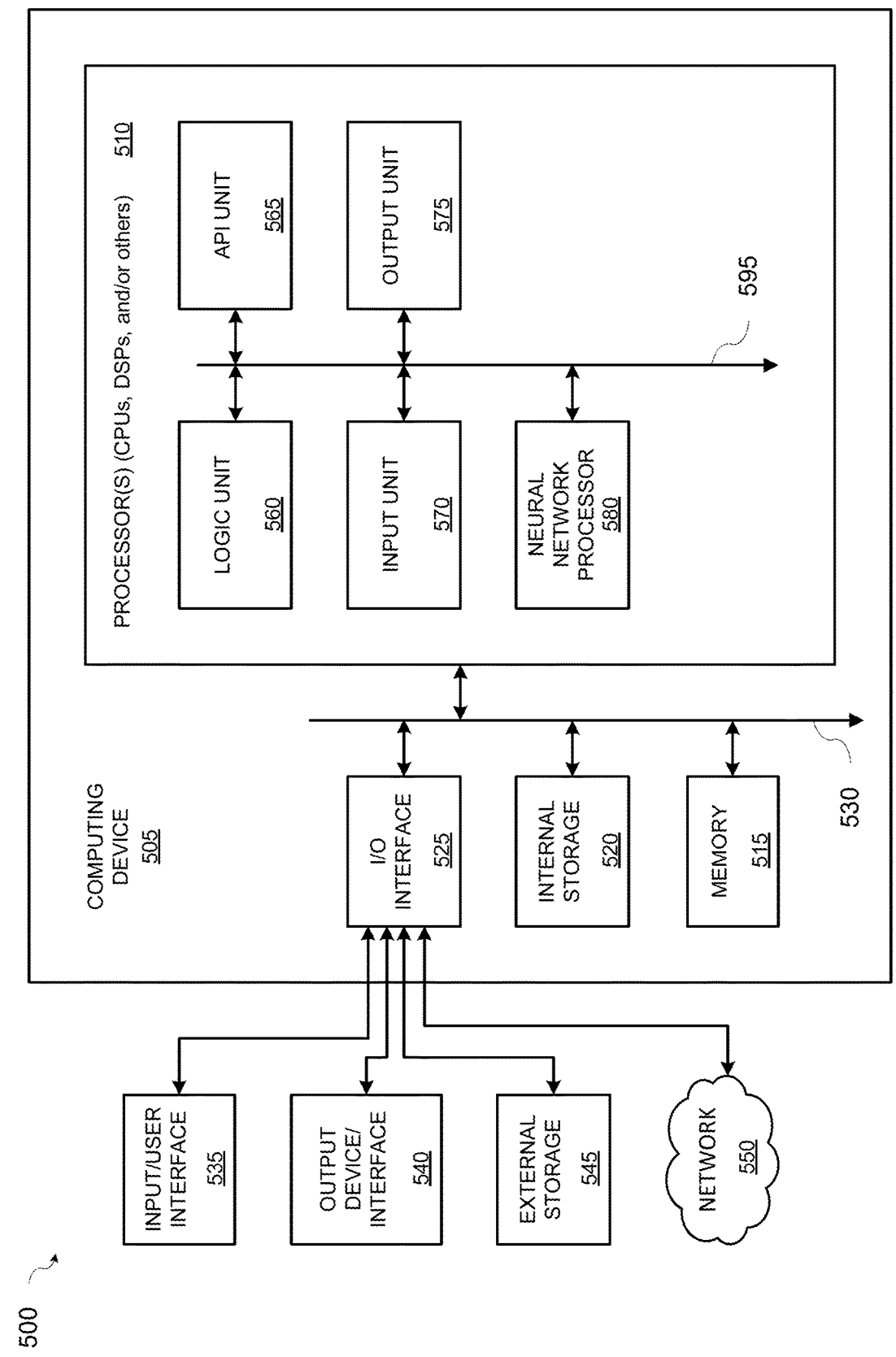
FIG. 5 is a block diagram of an example computing environment with an example computing device according to various aspects of the present disclosure.

FIG. 5 is a block diagram of an example computing environment 500 with an example computing device in accordance with various aspects of the present disclosure. The example computing environment 500 may suitable for use in some example implementations for collecting training data and executing a neural network model. Referring to FIG. 5, the computing device 505 in the example computing environment 500 may include one or more processing units, cores, or processors 510, memory 515 (e.g., RAM, ROM, and/or the like), internal storage 520 (e.g., magnetic, optical, solid state storage, and/or organic), and/or I/O interface 525, any of which may be coupled on a communication mechanism or a bus 530 for communicating information or embedded in the computing device 505.

The computing device 505 may be communicatively coupled to an input/user interface 535 and an output device/interface 540. Either one or both of the input/user interface 535 and the output device/interface 540 may be a wired or wireless interface and may be detachable. The input/user interface 535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). The output device/interface 540 may include a display, television, monitor, printer, speaker, braille, or the like. In some example implementations, the input/user interface 535 and the output device/interface 540 may be embedded with or physically coupled to the computing device 505. In other example implementations, other computing devices may function as or provide the functions of the input/user interface 535 and the output device/interface 540 for the computing device 505.

Examples of the computing device 505 may include, but are not limited to, mobile devices (e.g., tablets, notebooks, laptops, personal computers, portable televisions, radios, and the like), and devices not designed for mobility (e.g., desktop computers, other computers, and the like). The computing device 505 may be communicatively coupled (e.g., via the I/O interface 525) to an external storage device 545 and a network 550 for communicating with any number of networked components, devices, and systems, including one or more computing devices of the same or different configuration. The computing device 505 or any connected computing device may be functioning as, providing services of, or referred to as a server, client, thin server, general machine, special-purpose machine, or another label.

The I/O interface 525 may include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in the computing environment 500. The network 550 may be any network or combination of networks (e.g., the Internet, local area network, wide area network, a telephonic network, a cellular network, satellite network, and the like).

The computing device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

The computing device 505 can be used to implement techniques, methods, applications, processes, or computer-executable instructions in some example computing environments. Computer-executable instructions can be retrieved from transitory media, and stored on and retrieved from non-transitory media. The executable instructions may originate from one or more of any programming, scripting, and machine languages (e.g., C, C++, C#, Java, Visual Basic, Python, Perl, JavaScript, and others).

The processor(s) 510 may execute under any operating system (OS) (not shown), in a native or virtual environment. One or more applications may be deployed that include a logic unit 560, an application programming interface (API) unit 565, an input unit 570, an output unit 575, and an inter-unit communication mechanism 595 for the different units to communicate with each other, with the OS, and with other applications (not shown). The processor(s) 510 may further include a neural network processor 580. The neural network processor 580 may include multiple processors operating in parallel. The neural network processor 580 may implement neural networks, for example, but not limited to, Long Short Term Memory (LSTM) neural networks, feed-forward neural network, radial basis function neural network, or other types of neural networks. For example, the neural network processor 580 may be used in an implementation of one or more processes described and/or shown in FIG. 3. The described units and elements can be varied in design, function, configuration, or implementation and are not limited to the descriptions provided.

In some instances, the logic unit 560 may be configured to control information flow among the units and direct the services provided by the API unit 565, the input unit 570, the output unit 575, and the neural network processor 580 in some example implementations. For example, the flow of one or more processes or implementations may be controlled by the logic unit 560 alone or in conjunction with the API unit 565.

In some implementations, the example computing environment 500 may be or may include a cloud computing platform.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for generating a multi-layer predictive model, the method comprising:
   collecting historical observable data from one or more pieces of equipment of a same type, wherein the historical observable data is collected at different hierarchical levels of the one or more pieces of equipment, wherein the different hierarchical levels comprise a component level, a circuit level, and a logical path level, wherein first historical observable data of the historical observable data pertains to the component level and includes temperature data, vibration data, and friction data, wherein the first historical observable data pertains to an integrated circuit, a capacitor, and a resistor of the one or more pieces of equipment, wherein second historical observable data of the historical observable data pertains to the circuit level and includes input voltage data and current data, and wherein third historical observable data of the historical observable data pertains to the logical path level and includes operational hours data;
   collecting operational state indications of the one or more pieces of equipment corresponding to the collected historical observable data;
   generating, from the collected historical observable data and the collected operational state indications, a set of operational state models, wherein each operational state model corresponds to one of the different hierarchical levels; and
   generating, from outputs of the set of operational state models, a top-level operational model operable to determine maintenance and replacement timing for the one or more pieces of equipment.

2. The method of claim 1, wherein the operational state indications comprise an operational state indication, a degraded state indication, and a failed state indication.

3. The method of claim 1, further comprising:
   collecting the historical observable data asynchronously between the different hierarchical levels; and in response to collecting the historical observable data asynchronously:
  generating a first covariance matrix between outputs of a first hierarchical level operational state model and outputs of a second hierarchical level operational state model;
  generating a second covariance matrix between the outputs of the second hierarchical level operational state model and outputs of a third hierarchical level operational state model; and
  generating the top-level operational model using the first covariance matrix and the second covariance matrix as input.

4. The method of claim 3, further comprising temporally aligning the asynchronously collected historical observable data between the different hierarchical levels.

5. The method of claim 3, wherein each of the first hierarchical level operational state model, the second hierarchical level operational state model, and the third hierarchical level operational state model, outputs a single state probability estimate for a sequence of input observable data.

6. The method of claim 3, wherein the operational state indications are correlated to the asynchronously collected historical observable data for one of the different hierarchical levels.

7. The method of claim 3, further comprising:
  generating a top-level model output based on a product of a highest probability estimation state from each of the first covariance matrix and the second covariance matrix,
  wherein the top-level model output is a probability estimate of a next operational state or a mean time between failure (MTBF) for the one or more pieces of equipment.

8. The method of claim 1, further comprising:
  collecting the historical observable data synchronously between the different hierarchical levels; and
  in response to collecting the historical observable data synchronously:
    generating the top-level operational model using a first hierarchical level operational state model, a second hierarchical level operational state model, and a third hierarchical level operational state model.

9. The method of claim 8, further comprising generating a top-level model output based on a product of probability estimation states from outputs of each of the first hierarchical level operational state model, the second hierarchical level operational state model, and the third hierarchical level operational state model.

10. The method of claim 1, wherein:
  each operational state model of the set of operational state models is a machine learning model trained with the historical observable data collected from corresponding hierarchical levels; and
  the top-level operational model is a machine learning model trained with outputs of the set of operational state models and corresponding operational state indications.

11. A computer-implemented method for estimating a next operational state of a piece of equipment, the computer-implemented method comprising:
  collecting observable data from the piece of equipment, wherein the observable data is collected at different hierarchical levels of the piece of equipment, wherein the different hierarchical levels comprise a component level, a circuit level, and a logical path level, wherein first observable data of the observable data pertains to the component level and includes temperature data, vibration data, and friction data, wherein the first observable data pertains to an integrated circuit, a capacitor, and a resistor of the piece of equipment, wherein second observable data of the observable data pertains to the circuit level and includes input voltage data and current data, and wherein third observable data of the observable data pertains to the logical path level and includes operational hours data;
  inputting the collected observable data to a predictive model at a set of operational state models corresponding to the different hierarchical levels;
  generating an output from each operational state model of the set of operational state models, the output being a state probability estimate for each of the different hierarchical levels; and
  generating, from a top-level operational model, an output based on the outputs of the set of operational state models, wherein the output from the top-level operational model is a probability estimate of a next operational state or a mean time between failure (MTBF) for the piece of equipment.

12. The computer-implemented method of claim 11, wherein the next operational state comprises an operational state, a degraded state, or a failed state.

13. The computer-implemented method of claim 11, further comprising:
  determining that the observable data is collected asynchronously between the different hierarchical levels; and
  in response to determining that the observable data is collected asynchronously:
    generating a first covariance matrix between outputs of a first hierarchical level operational state model and outputs of a second hierarchical level operational state model;
    generating a second covariance matrix between the outputs of the second hierarchical level operational state model and outputs of a third hierarchical level operational state model; and
    generating the output of the top-level operational model based on a product of a highest probability estimation state from each of the first covariance matrix and the second covariance matrix, wherein the output of the top-level operational model is a probability estimate of a next operational state or a mean time between failure (MTBF) for the piece of equipment.

14. The computer-implemented method of claim 11, further comprising:
  determining that the observable data is collected synchronously between the different hierarchical levels; and
  in response to determining that the observable data is collected synchronously, generating the output from the top-level operational model based on a product of probability estimation states from outputs of each of a first hierarchical level operational state model, a second hierarchical level operational state model, and a third hierarchical level operational state model.

15. The computer-implemented method of claim 11, wherein:
  each operational state model of the set of operational state models is a machine learning model trained with historical observable data collected from corresponding hierarchical levels; and the top-level operational model is a machine learning model trained with outputs of the set of operational state models and corresponding operational state indications.

16. An apparatus comprising:
a memory configured to store program instructions and data; and
a processor configured to communicate with the memory, the processor further configured to execute instructions read from the memory, the instructions operable to cause the processor to perform operations including:
collecting observable data from a piece of equipment, wherein the observable data is collected at different hierarchical levels of the piece of equipment, wherein the different hierarchical levels comprise a component level, a circuit level, and a logical path level, wherein first observable data of the observable data pertains to the component level and includes temperature data and vibration data, wherein the first observable data pertains to an integrated circuit, a capacitor, and a resistor of the piece of equipment, wherein second observable data of the observable data pertains to the circuit level and includes input voltage data and current data, and wherein third observable data of the observable data pertains to the logical path level and includes operational hours data;
inputting the collected observable data to a predictive model at a set of operational state models corresponding to the different hierarchical levels;
generating an output from each operational state model of the set of operational state models, the output being a state probability estimate for each of the different hierarchical levels; and
generating, from a top-level operational model, an output based on the outputs of the set of operational state models, wherein the output from the top-level operational model is a probability estimate of a next operational state or a mean time between failure (MTBF) for the piece of equipment.

17. The apparatus of claim 16, wherein the next operational state comprises an operational state, a degraded state, or a failed state.

18. The apparatus of claim 16, further comprising instructions operable to cause the processor to perform operations including:
determining that the observable data is collected asynchronously between the different hierarchical levels; and
in response to determining that the observable data is collected asynchronously:
generating a first covariance matrix between outputs of a first hierarchical level operational state model and outputs of a second hierarchical level operational state model; and
generating a second covariance matrix between the outputs of the second hierarchical level operational state model and outputs of a third hierarchical level operational state model; and
generating the output from the top-level operational model based on a product of a highest probability estimation state from each of the first covariance matrix and the second covariance matrix, wherein the output of the top-level operational model is a probability estimate of a next operational state or a mean time between failure (MTBF) for the piece of equipment.

19. The apparatus of claim 16, further comprising instructions operable to cause the processor to perform operations including:
determining that the observable data is collected synchronously between the different hierarchical levels; and
in response to determining that the observable data is collected synchronously, generating the output from the top-level operational model based on a product of probability estimation states from outputs of each of a first hierarchical level operational state model, a second hierarchical level operational state model, and a third hierarchical level operational state model.

20. The apparatus of claim 16, wherein the third observable data pertains to a transmitter circuit of the piece of equipment and includes fourth observable data pertaining to the transmitter circuit operating in a first power mode and fifth observable data pertaining to the transmitter circuit operating in a second power mode, and wherein the second power mode is a higher power mode relative to the first power mode.

* * * * *